C. W. PITLICK.
SELF CLEANING CURRYCOMB.
APPLICATION FILED SEPT 25, 1919.
1,381,007.
Patented June 7, 1921.
2 SHEETS—SHEET 1.
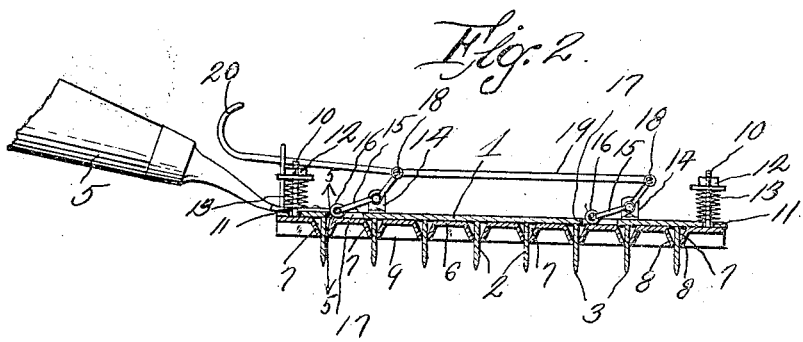
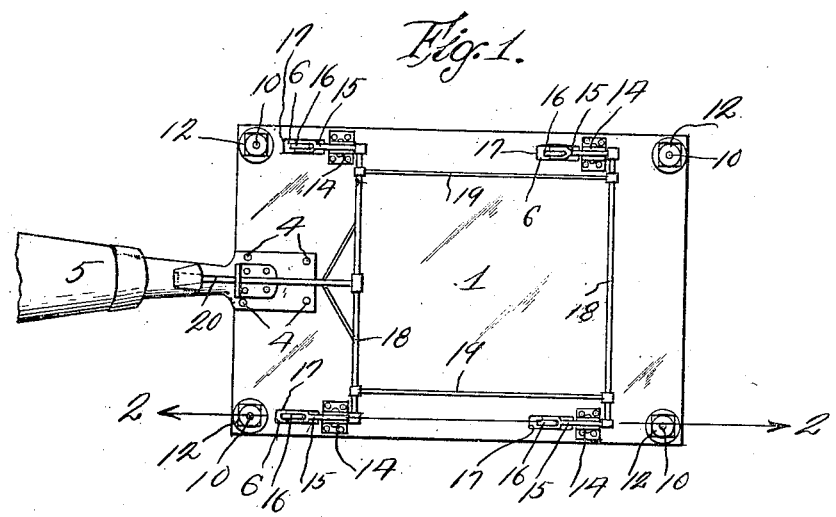
Inventor
Carl W. Pitlick
By D. Swift
Attorney C. W. PITLICK.
SELF CLEANING CURRYCOMB.
APPLICATION FILED SEPT 25, 1919.
1,381,007.
Patented June 7, 1921.
2 SHEETS—SHEET 2.
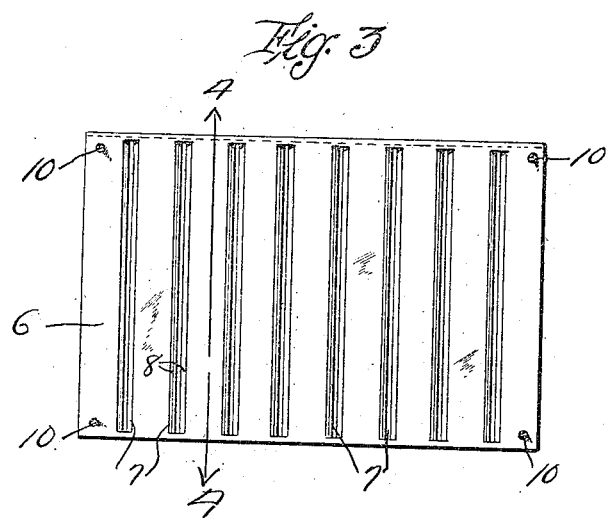
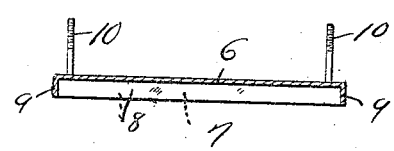
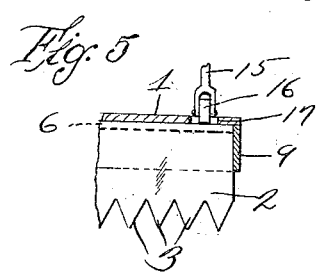
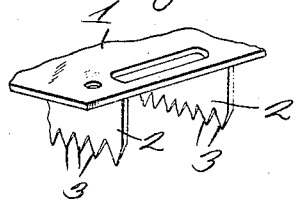
Inventor
Carl W. Pitlick
By D. Swift
Attorney

UNITED STATES PATENT OFFICE.

CARL W. PITLICK, OF OAHE, SOUTH DAKOTA.

SELF-CLEANING CURRYCOMB.

1,381,007.                    Specification of Letters Patent.      Patented June 7, 1921.

Application filed September 25, 1919. Serial No. 326,207.

*To all whom it may concern:*

Be it known that I, CARL W. PITLICK, a citizen of the United States, residing at Oahe, in the county of Hughes, State of South Dakota, have invented a new and useful Self-Cleaning Currycomb; and I do hereby declare the following to be a full, clear, and exact description of the invention, such as will enable others skilled in the art to which it appertains to make and use the same.

The invention relates to curry-combs and has for its object to provide means whereby the teeth of the curry-comb may be cleaned during the operation of currying a horse or other animal.

With the above and other objects in view the invention resides in the combination and arrangement of parts as hereinafter set forth shown in the drawings and claimed, it being understood that changes in the precise embodiment of the invention may be made within the scope of what is claimed without departing from the spirit of the invention.

In the drawings:—

Figure 1 is a top plan view of the curry-comb.

Fig. 2 is a longitudinal sectional view taken on line 2—2 of Fig. 1.

Fig. 3 is a top plan view of the tooth cleaning plate.

Fig. 4 is a sectional view taken on line 4—4 of Fig. 3.

Fig. 5 is a detail view showing the roller engaging the tooth cleaning plate.

Fig. 6 is a detail perspective view of a portion of the tooth carrying plate.

Referring to the drawings, the numeral 1 designates the body or main plate of the comb, said body being provided with a series of transversely disposed plates 2 having teeth 3, which teeth are formed in the shape of the teeth used in curry-combs. Secured by means of rivets 4 to one end of the body member 1 is a handle 5, by means of which handle the comb as a whole may be easily and quickly passed over an animal. A tooth cleaning plate 6 is provided, said plate having a series of transversely disposed V-shaped slots 7 formed by flanges 8, said flanges 8 being adapted to engage the front and rear walls of the transversely disposed tooth bars 2 so that as the cleaning plate 6 is forced downwardly, said flanges 8 will force the hair that may have become entangle in the teeth 3 from said teeth. The longitudinal side edges of the cleaning plate 6 are provided with downwardly extending flanges 9 which lend stiffness longitudinally to the plate 6, while the transversely disposed flanges 8 stiffen the plate 6 transversely.

Cleaning plate 6 is provided with upwardly extending threaded pins 10, one of said pins being at each corner and extending upwardly through apertures 11 in the body plate 1. Threaded on the ends of the pins 10 are nuts 12 and disposed between said nuts and the upper surface of the body member 1 are coil springs 13, said coil springs normally maintaining the cleaning plate 6 in close engagement with the under face of the body plate 1. Rockably mounted in bearings of brackets 14 are levers 15, the lower ends of said levers having journaled therein rollers 16, which rollers extend downwardly through apertures 17 in the body plate 1 and are normally in contact with the upper face of the tooth cleaning plate 6 and are adapted to be forced downwardly so that said plate 6 will be forced downwardly against the action of the springs 13 so that the flanges 8 will clean the hair from the teeth 3. Levers 15 are preferably disposed near the four corners of the curry-comb. However, the levers at each end of the comb as a whole have their upper ends connected by a rod 18, said rods being in turn connected by connecting rods 19 so that the levers will move in unison when a pull is imparted to the operating lever 20 by means of the finger of the user of the comb.

From the above it will be seen that a curry-comb is provided wherein the hair that usually collects in the teeth of the comb may be quickly, easily and completely removed from the teeth. It will also be seen that by extending the teeth downwardly through flanged apertures in the tooth cleaning plate a scraping action will take place on the teeth.

The invention having been set forth what is claimed as new and useful is:—

A tooth cleaner for curry-combs comprising a plate adapted to be held in engagement with the under face of the comb body member, elongated transversely disposed slots in said cleaner plate adapted to receive the toothed transverse bars of the curry-comb, the corners of said cleaner plate being provided with upwardly extending threaded lugs having nuts on their ends, said lugs extending upwardly through apertures in the corners of the comb body member, coil springs disposed between the lug nuts and the upper face of the body member for maintaining the cleaner plate in engagement with said body member, pivoted levers carried by brackets at the corners of the body member, one end of said pivoted levers being provided with rollers, said rollers being disposed in engagement with the upper face of the cleaner plate through elongated apertures in the body member, the upper ends of the links being connected together and means whereby said pivoted levers may be rocked in unison thereby forcing the cleaner plate downwardly for cleaning the toothed bars.

In testimony whereof I have signed my name to this specification in the presence of two subscribing witnesses.

CARL W. PITLICK.

Witnesses:
 ROBERT I. RIGGS,
 HOWARD LORENSEN.